(12) United States Patent
Kitchener et al.

(10) Patent No.: US 9,054,519 B2
(45) Date of Patent: Jun. 9, 2015

(54) ELECTRICAL CIRCUIT WITH SURGE PROTECTION MONITORING

(75) Inventors: Renato Kitchener, West Sussex (GB); Gunther Rogoll, Mannheim (DE)

(73) Assignee: Pepperl + Fuchs GmbH (DE)

( * ) Notice: Subject to any disclaimer, the term of this patent is extended or adjusted under 35 U.S.C. 154(b) by 280 days.

(21) Appl. No.: 13/508,464

(22) PCT Filed: Nov. 11, 2010

(86) PCT No.: PCT/GB2010/002083
§ 371 (c)(1),
(2), (4) Date: May 7, 2012

(87) PCT Pub. No.: WO2011/058318
PCT Pub. Date: May 19, 2011

(65) Prior Publication Data
US 2012/0224291 A1    Sep. 6, 2012

(30) Foreign Application Priority Data
Nov. 11, 2009    (GB) .................................. 0919699.9

(51) Int. Cl.
*H02H 3/04* (2006.01)
*H02H 9/04* (2006.01)

(52) U.S. Cl.
CPC . *H02H 9/042* (2013.01); *H02H 3/04* (2013.01)

(58) Field of Classification Search
CPC ................................. H02H 3/04; H02H 9/042
USPC ....................................................... 361/111
See application file for complete search history.

(56) References Cited

U.S. PATENT DOCUMENTS

| 4,901,183 | A  | * | 2/1990  | Lee ................................. 361/56 |
| 7,005,863 | B2 | * | 2/2006  | Gudmundsson et al. ..... 324/549 |
| 7,158,041 | B2 | * | 1/2007  | McDonald et al. ........... 340/635 |
| 2004/0217744 | A1 | * | 11/2004 | Walters et al. ................ 323/277 |
| 2005/0104734 | A1 | * | 5/2005  | Graube ......................... 340/650 |

FOREIGN PATENT DOCUMENTS

| DE | 102008016589 A1 | 10/2009 |
| EP | 0326903 A1 | 8/1989 |
| EP | 0386288 A1 | 9/1990 |
| EP | 1870976 A2 | 12/2007 |

OTHER PUBLICATIONS

Harr et al. "Device for Monitoring Electronic Circuits or Components", english machine translation of EP0386288, 1990.*
International Search Reoprt and Written Opinion for Application No. PCT/GB2010/002083 dated Feb. 7, 2011.

* cited by examiner

*Primary Examiner* — Thienvu Tran
*Assistant Examiner* — Kevin J Comber
(74) *Attorney, Agent, or Firm* — Lerner, David, Littenberg, Krumholz & Mentlik, LLP

(57) ABSTRACT

An electrical circuit comprising a power supply, a load and a surge protection device adapted to protect said load and/or power supply from electrical fast transient events according to the requirements of IEC 61000-4-2 or 4 and which comprises a stress threshold, in which the electrical circuit further comprises a monitoring device adapted to monitor the current in said surge protection device and detect the breaching of said threshold by electrical fast transient events.

23 Claims, 4 Drawing Sheets

ELECTRICAL CIRCUIT WITH SURGE PROTECTION MONITORING

CROSS-REFERENCE TO RELATED APPLICATIONS

The present application is a national phase entry under 35 USC §371 of International Application No. PCT/GB2010/002083, filed Nov. 11, 2010, published in English, which claims priority from Great Britain Patent Application No. 0919699.9 filed Nov. 11, 2009, all of which are incorporated herein by reference.

The present invention relates to an electrical circuit with surge protection monitoring, for use particularly, but not exclusively to monitor surge protection devices used in Fieldbus circuits.

Fieldbus (or field bus) is the name of a family of industrial computer network protocols used for real-time distributed control, now standardized as IEC 61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the fieldbus, which links the PLCs to the components which actually do the work such as sensors, actuators, electric motors, console lights, switches, valves and contactors.

Fieldbus is often used in Intrinsically Safe environments, for example combustible atmospheres, and in particular gas group classification IIC, Hydrogen and Acetylene, and below, for example gas group IIB and IIA, for gas and/or dust. Using the Fieldbus protocol, field instruments and equipment in such an environment are controlled and monitored remotely via an electrical communications circuit often provided in the same electrical circuit as the power to drive the field instruments.

All electronic devices, not just those use in a Fieldbus circuit, are required to be protected against power surges according to the relevant standards applied to that type of device. Therefore, it is known to provide a surge protection device in the electrical circuit which supplies power and/or communications to the electronic device in question. Such surge protection devices act to protect sensitive electronics from over voltage and/or over current stress caused by events like electrostatic discharge (ESD), cable back e.m.f., secondary lightening strikes, cross coupling from high voltage lines, pick up and any other transient effect. Such events are referred to as "electrical fast transient events" according to the IEC 61000-4-2 and IEC 61000-4-4 standards, which sets the benchmark requirements for protection devices.

These electrical fast transient events can be common mode, which is to say they affect both the positive and negative sides of the circuit in the same way, or they can be differential mode, which is to say they affect one side of the circuit differently to the other. In order to provide common mode surge protection a device must be connected to ground, while differential mode protection requires a device to be mounted across the circuit. An electrical fast transient event is usually a pulse or spike, but it can also be a continuous over voltage stress. It can affect any component in a circuit, and it can occur anywhere inside a circuit or come from any direction upstream or downstream of a circuit. For example, Zener Diodes in an isolating barrier or a shunt barrier in a Fieldbus arrangement could be subjected to power supply over voltage as well as field cable over voltage.

Most known surge protection devices are shunt devices with a shunt across the power and/or communication rails of a circuit, and with the option of shunting each rail to ground. The protection components themselves are predominantly fast acting semiconductor devices, Transorbs or Varistors (MOV's), with a mixture of gas discharge for high currents, inductors, resistors, capacitors and so on arranged in a certain manner for the best performance and capacity.

In each case, the protection component, or series of components, comprises a common point of failure in a circuit. Some protection components are one use only, and are not expected to work after dealing with the first voltage surge. However, others are expected to protect electronics from voltage surges up to a given number of times, according to a particular standard. In some cases they may only be expected to protect the target electronics after a voltage surge, and not necessarily exhibit a high impedance. However, in all cases when the system does fail it will either fail to an exposed state, or it will load the circuit. The latter instance would be a common point of failure for a Fieldbus circuit, and all devices in the circuit would be "lost". Zener Diodes typically short circuit, while a transient voltage suppressor (TVS) components fail open, or short, or go to a low impedance. A protection device experiencing a fault could also have other disruptive affects on an IEC61158-2 Fieldbus signal or network.

However, the problem with known surge protectors is that it is not known if they have ever been stressed. The actual number of power surges a device has experienced is never known, even after a seemingly innocuous static discharge. As such, there is no way of knowing the condition of a surge protector.

Moreover, if a surge protector is certified or specified to withstand a number of electrical fast transient events, one can never be certain how many have been experienced. This presents a particular problem where the device is a common point of failure for the circuit and fails to a loaded state, as is often the case in Fieldbus arrangements, because the risk of such failure is not quantifiable. As such, effective preventative or proactive maintenance is not feasible.

Floating apparatus, like battery equipment, can help to minimise the effects of common mode voltage surges. However, most electronic equipment has some sort of path to ground, even if this is capacitive coupled. In addition, unbalance can be a problem, and in many cases a common mode voltage surge will result in differential mode effects. For example, a cable break can often cause a high terminal voltage in differential mode, due to the back e.m.f. effect of the cable and/or any inductive load, where protection diodes are not used or have failed. For high impedance power sources, such as Fieldbus, the back e.m.f. is not effectively impeded.

It is known to monitor the output terminals of an electrical circuit to glean a wide range of diagnostic information, in particular with Fieldbus systems used in process plants. For example, a series of detectable transient current cut outs could be indicative of an intermittent cable break, and this information can be used to warn an operator of the possibility of a plant explosion caused by an incendive arc.

However, it is not known to use such general monitoring systems to detect electrical fast transient events, because they would be too fast for known systems to sense. It might be possible if the electronics were vastly extended and the sensing systems upgraded to the speeds required, but this would be highly complex and expensive.

The present invention is intended to overcome some of the above described problems.

Therefore, according to the present invention, an electrical circuit comprises a power supply, a load and a surge protection device adapted to protect said load and/or power supply from electrical fast transient events according to the requirements of IEC 61000-4-2 or 4 and which comprises a stress threshold, in which the electrical circuit further comprises a monitoring device adapted to monitor the current in said surge protection device and detect the breaching of said threshold by electrical fast transient events.

Thus, the present invention provides a monitoring device which specifically monitors the current incident in the surge protection device, such that it can be known if it has been subjected to an electrical fast transient event.

In one version of the invention the surge protection device can be differential mode. In an alternative the surge protection device can be common mode. It will be appreciated that both can also be provided.

The monitoring device can utilise the electromagnetic or electrostatic fields caused by the current flowing through the protection device as the means of detection, either by inductive or capacitive monitoring. As such, the monitoring device can be a coil of wire or PCB track axially wound around the protection device and/or a conductive lead or PCB track of the protection device. Alternatively, the monitoring device can be a coil of wire, a coil of PCB track or a capacitive plate arranged in parallel with the protection device and/or a conductive lead or PCB track of the protection device.

Where an axial winding is used this will result in a high pickup voltage. However, the protection device and its conductive lead or PCB track will exhibit a high electromagnetic field when carrying a high AC or transient current which can be detected. Where a mutually coupled inductor coil or a capacitive plate placed or arranged in parallel is used instead, this will detect the high electrostatic field generated when the protection device and its conductive lead or PCB track carry a high AC or transient current. In both cases, it is the electromagnetic or electrostatic field that the protection component and/or its wiring or PCB track generates that is used to detect the voltage surge. It will be appreciated that such a measurement arrangement also allows for the magnitude, duration and other characteristics of the power surge to be measured.

Various other methods of detection can also be used. For example, the monitoring device can comprise a sensor adapted to detect a change in a physical state of the protection device, which physical state can be one or more of the following: magnetic state or optically detectable physical state. Optical detection could be realised using fast optical sensors arranged to detect a gas discharge made by a protection device in use. Other indirect methods of detection can include Hall effect semiconductors, or current probes.

The monitoring device could also comprise a sensor directly connected to the protection device and/or a conductive lead or PCB track of the protection device, for example one or more of the following: a transformer, a capacitor, a resistor, or a semiconductor.

However the monitoring is performed, an output of said monitoring device can be connected to a diagnostic means, which can be adapted to discern from raw data received from said output if said stress threshold has been breached in use. The diagnostic means can be adapted to present human discernable data to a user derived from said raw data. This could be performed on site using any human discernable method, including an audible or visual alarm. However, in a preferred construction said diagnostic means can comprise a field based communications device and a human machine interface at a separate location. The communications device can be adapted to send machine readable communications data to said human machine interface derived from said raw data, and said human machine interface can be adapted to convert said machine readable communications data into human discernable data. The communications between the communications device and the human machine interface can be via radio, wire, magnetic, optical, IEC 61158-2 physical layer or software adjustment and so on. The human machine interface can be a handheld device used in the field, or it can be in a control room remote from the field.

The minimum human discernable data required in use is an indication that an electrical fast transient event has occurred and that said stress threshold has been breached. However, it will be appreciated that far more information can be gleaned from the raw data gathered in use. Therefore, the human discernable data presented by the diagnostic means can include one or more of the following factors: i) the detection of a breach of said threshold by an electrical fast transient event; ii) the number of times a breach of said threshold by an electrical fast transient event has been detected; iii) the frequency of breaches of said threshold by an electrical fast transient event; iv) the detection of a current surge between a trigger level and said threshold; v) the reaching of a pre-determined number of times a breach of said threshold by an electrical fast transient event have been detected; vi) characteristics of a breach of said threshold by an electrical fast transient event, including one or more of its duration, magnitude, amplitude, integral or wave shape.

Factor i) above is important for all embodiments, but finds particular application with surge protection devices which are intended to be one use only. Once a breach of said threshold has been detected an alarm can be issued, and the surge protection device can be replaced to avoid the risk of future failure, if it has not already failed.

With regard to factor ii) above, this would find application with surge protection devices which are intended to withstand a pre-determined number of electrical fast transient events. The diagnostic means can count the number of detected breaches of the threshold, and this information can be conveyed to the user in a useful way. For example, the human machine interface can actually indicate the number of detected breaches, and perhaps announce them with increasing urgency, for example with different colours, or with text.

Factor iii) above, being the frequency of breaches of said threshold by an electrical fast transient event, can find application where the time gap between breaches may impact upon the performance of the protection device, or be usefully indicative of the likely timing of future breaches. For example, if there is a breach once every 6 months, for the first 2 to 5 breaches, then it can be estimated that the next occurrence may not occur in 'n' months. This information can be useful for planning maintenance and repairs. If it is found that the frequency is shorter, and within a predetermined lower limit, then a particular warning to the user can be presented sooner rather than later, indicating that there may be a frequent fault that could imminently cause the protection circuit to fail. On the other hand, if a breach occurs very infrequently, and beyond a predetermined upper limit, for example only once every year, then a particular status report can be presented to the user indicating that maintenance or repair of the protection device can be postponed to a much later time, or after a higher number of breaches. Also, if a cluster of breaches occur during certain known events, then a message may be presented to the user giving the time and date of the breaches, and this information can be correlated to known maintenance work, motors and pumps starting, routine calibration and so on. It may also be cross-referenced to things like known lightening strikes.

Factor iv) above, being the detection of a current surge between a trigger level and said threshold, allows for the diagnostic means to detect electrical transient events which are of interest, but which do not actually breach said threshold. This may be useful with particular types of protection device, or it may be useful when a user wants to check if an event, for example a lightening strike, did result in a breach of said threshold or not. The trigger level can also allow the diagnostic means to filter out activity which is below it, for example regular power supply activity, communications activity and so on.

Factor v) above, being the reaching of a pre-determined number of times a breach of said threshold by an electrical fast transient event have been detected, finds particular application with protection devices which have a known lifespan. For example when a TVS tested to withstand ten or twenty breaches of said threshold is used, a warning alarm can be issued to the user when that number has actually been reached, so remedial action can be taken.

Factor vi) above, being characteristics of a breach of said threshold by an electrical fast transient event, including one or more of its duration, magnitude, amplitude, integral or wave shape, allows the diagnostic means to gather and/or present useful diagnostics data on the breaches which have occurred.

Other kinds of diagnostic information can be gathered if the raw data is correlated with other data about the electrical circuit acquired in use by known general diagnostics equipment. For example, the number of times a breach of said threshold has been counted can be compared to impedance performance of a Fieldbus system to accesses the sate of the protection arrangement. In particular, a reduction in signal amplitude could indicate that the protection device is damaged, even if it should still function after a given number of breaches of said threshold. The opposite can also ascertained, for example a reduction in signal amplitude could be explained by the breach count, so other potential attenuation faults can be discounted.

The machine readable communications data sent to the human machine interface in use can be via a communications means separate from the electrical circuit. This could be a discrete communications circuit, or it could be something like a radio link, as referred to above.

However, the machine readable communications data can also be sent to the human machine interface over the electrical circuit itself, for example using the Fieldbus communications protocol. In one particular version of the invention the machine readable communications data can comprise physical layer modifications made to the electrical circuit, which are discernable by said human machine interface. Such a manner of communication is known, and finds particular application with Fieldbus systems.

As referred to above, the surge protection can be differential mode or common mode, and any of the above described features could apply to either configuration. However, where all the above described features are used with a differential mode arrangement, the electrical circuit can further comprise a second surge protection device adapted to protect said load and/or power supply from electrical fast transient events according to the requirements of IEC 61000-4-2 or 4 and which comprises a stress threshold, and the electrical circuit can further comprise a second monitoring device adapted to monitor the current in said second surge protection device and detect the breaching of said threshold by electrical fast transient events, and said second surge protection device can be common mode.

This second monitoring device can comprise any of the features explained above in relation to a common mode arrangement.

As also referred to above, the present invention finds particular application with a Fieldbus electrical circuit, so preferably the electrical circuit can be a Fieldbus circuit confirming to the IEC 61158-2 standard.

The present invention can be implemented in practice in a number of possible ways. For example, the surge protection device may be integrated with the electrical circuit, or it may be a discrete item connected thereto on a motherboard. In addition, the protection device may be multiplexed at any stage. The monitoring device can also be included within an enclosure with the surge protection device, with or without means to present human discernable data on site. There could also be a common bus linking a number of surge protection devices, or the protection devices could share a common motherboard and so on.

In addition, with Fieldbus segments it is possible to have more than one surge protection system attached each. For example, one may be positioned at the power supply and another at the load, which in the case of a typical Fieldbus installation could be a plurality of loads comprising device couplers.

The invention can be performed in various ways, but five embodiments will now be described by way of example, and with reference to the accompanying drawings, in which.

Figure 1:
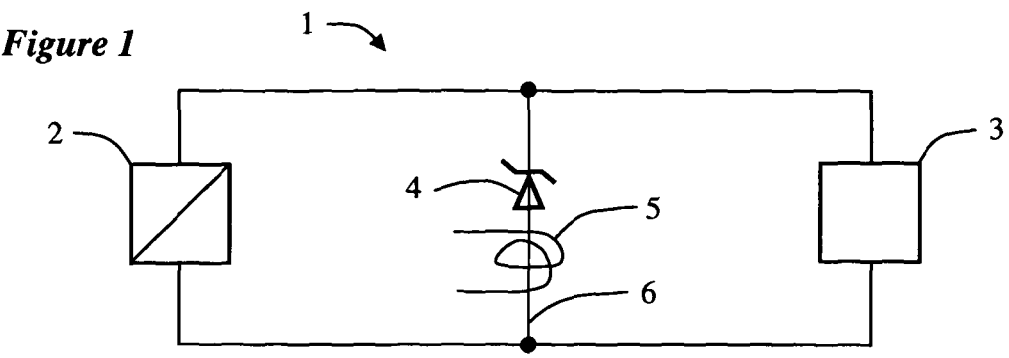
FIG. 1 is a diagrammatic view of a first electrical circuit according to the present invention.

As shown in FIG. 1, an electrical circuit 1 comprises a power supply 2, a load 3 and a surge protection device 4, which in this case is in the form of transient voltage suppressor, which is adapted to protect said load 3 and/or power supply 2 from electrical fast transient events according to the requirements of IEC 61000-4-2 or 4 and which comprises a stress threshold. The electrical circuit 1 further comprises a monitoring device 5, which in this case is an axial winding, which is adapted to monitor the current in said surge protection device 4 and detect the breaching of said threshold by electrical fast transient events.

FIG. 1 is a very simple electrical circuit, and its purpose is merely to illustrate the basic principals of the present invention. As is clear from this figure, the current flowing through the lead 6 to the TVS 4 generates an electromagnetic field the inductance of which is detected by the winding 5. As such, the occurrence of a electrical fast transient event will result in a current spike in the lead 6, which will be detected by the winding 5. The actual stress threshold of the TVS will be known from its technical specifications, and therefore the current level detected can be compared to empirical data specific to the monitoring arrangement used, to determine if a detected current spike breaches that threshold or not. The arrangement in FIG. 1 is differential mode.

Figure 2:
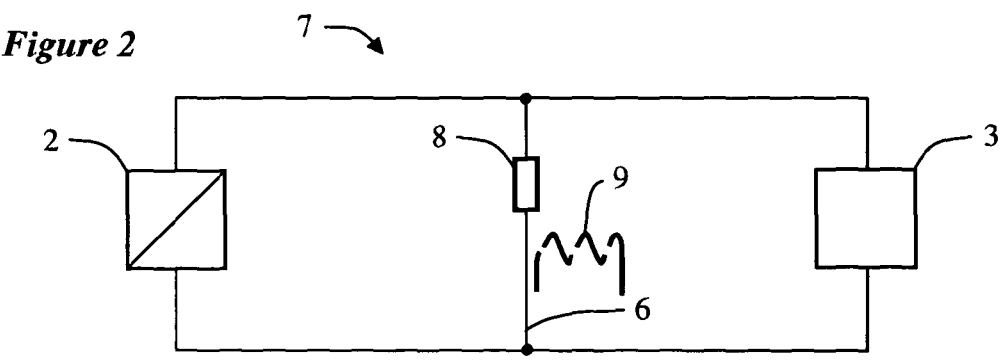
FIG. 2 is a diagrammatic view of a second electrical circuit according to the present invention.
Figure 3:
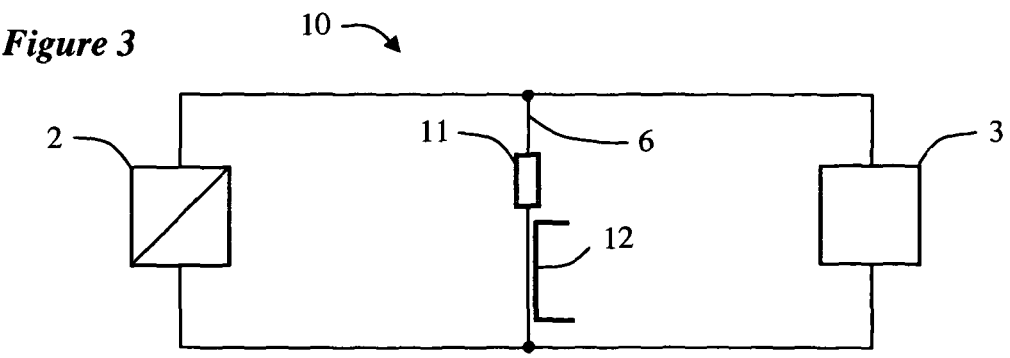
FIG. 3 is a diagrammatic view of a third electrical circuit according to the present invention.

FIGS. 2 and 3 are also simple electronic circuits which illustrate the basic principals of the invention. Where components are the same as in FIG. 1, the same reference numerals have been used. This applies to all the Figures. In FIG. 2, a mutually coupled winding 9 adjacent to the surge protection device 8 is used as the monitoring device instead of an axial winding. Here, the electromagnetic field of the lead 6 is monitored by the winding 9 for the purposes of detecting the occurrence of an electrical fast transient event. In FIG. 3 a capacitive plate 12 arranged in parallel with the protection device 11 is used instead of a winding. Again, the actual stress thresholds of the protection devices 8 and 11 (which are not specific in these Figures) will be known from their technical specifications, and the current level detected can be compared to empirical data to determine if detected current spikes breach the thresholds or not.

In all three cases it is the electromagnetic or electrostatic field that the protection component and/or its wiring or PCB track generates that is used to detect the voltage surge. It will be appreciated that such a measurement arrangement also allows for the magnitude, duration and other characteristics of the voltage surge to be measured.

Figure 4:
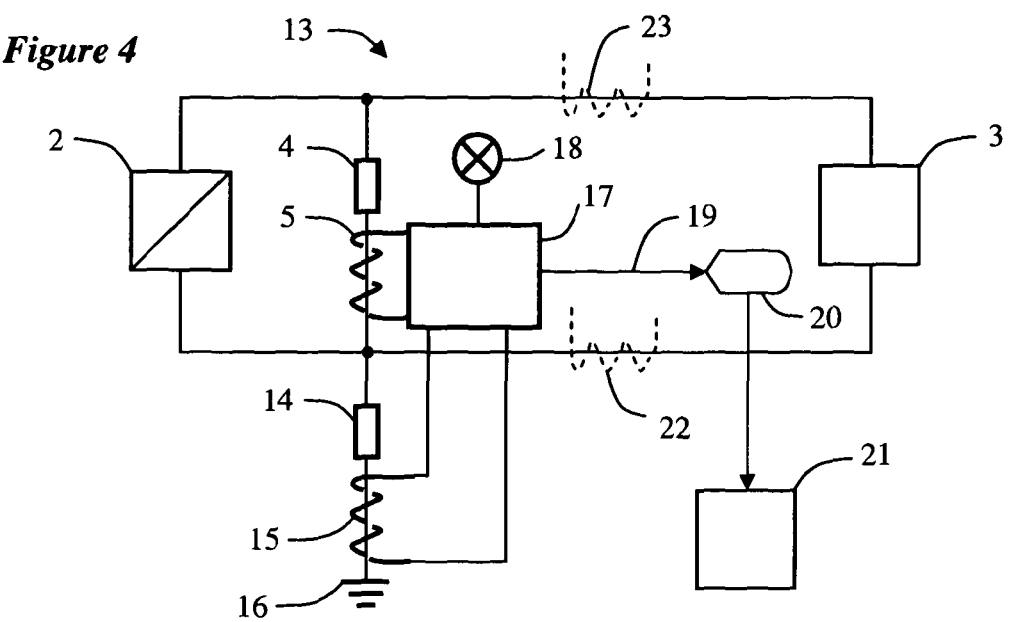
FIG. 4 is a diagrammatic view of a fourth electrical circuit according to the present invention.

FIG. 4 illustrates a more practical manifestation of the present invention. Here, the electrical circuit 13 conforms with the IEC 61158-2 Fieldbus standard, and has a differential surge protection device 4 and a common mode surge protection device 14 fed to ground 16. Again, these devices 4 and 14 are not specified as they could be any known device. (The common mode surge protection arrangement can use a connection to each pole, i.e. two protection circuits, or it can use a centre tap, i.e. one circuit.) In both cases the monitoring device comprises an axial winding 5 and 15 wound around the conductive lead of the protection devices 4 and 14 respectively, which detect any surge current that may be incident through either of the devices 4 or 14. Once again, the actual stress thresholds of the protection devices 4 and 14 will be known from their technical specifications, and therefore the current level detected can be compared to empirical data specific to the monitoring arrangement used, to determine if a detected current spike breaches that threshold or not. FIG. 4 shows how this is done.

In particular, both of the axial windings 5 and 15 are fed to a conditioning unit 17, which receives raw data therefrom. The conditioning unit 17 is located in the field, and comprises a "field based communications device" as defined in claim 9 below. The conditioning unit 17 converts the raw data it receives into machine readable communications data, indicated at 20 in FIG. 4, and sends this data via a communications line 19 to a human machine interface 21 in a control room. In this instance the human machine interface comprises the part of the diagnostic means which processes the data received in use, and then presents predetermined relevant information to the user. This information can be any of the factors described above depending on how the circuit 13 is set-up to operate, namely: i) the detection of a breach of said threshold by an electrical fast transient event; ii) the number of times a breach of said threshold by an electrical fast transient event has been detected; iii) the frequency of breaches of said threshold by an electrical fast transient event; iv) the detection of a current surge between a trigger level and said threshold; v) the reaching of a pre-determined number of times a breach of said threshold by an electrical fast transient event have been detected; vi) characteristics of a breach of said threshold by an electrical fast transient event, including one or more of its duration, magnitude, amplitude, integral or wave shape. The human machine interface 21 can use a database of information containing the stress thresholds of the protection devices 4 and 14, as well as all the information recorded to date, to arrive at any of the above factors. The manner in which a computer program can be created to achieve this is well known, and is not further described here. The relevance and usefulness of these various possible pieces of data are discussed above.

The conditioning unit 17 is also provided in this case with an on site visual interface, which can also present data to users on site. For example, it can be a flashing LED sequence to indicate how may breaches of the threshold the protection devices 4 or 14 have experienced, for example 1 flash every 3 seconds to indicate one breach, 2 flashes at an interval of 0.5 seconds, every 3 seconds to indicate two breaches and so on. The colour can also change from green to amber to red, depending on criticality. It will be appreciated that a degree of processing is required of the conditioning unit 17 to perform such functions, and as such in this instance the conditioning unit 17 can also or alternatively form a part of the diagnostic means which presents human discernable data to the user. A simple LED arrangement like this is basic, but it saves on the parasitic load. (The conditioning unit 17 is simply shown diagrammatically in FIG. 4, and in practice it can be integral within a surge protection enclosure. As such, when it functions only with the LED 18 it can be basically discrete, and have no interface from that point. Alternatively, the conditioning unit can be located in a control room rather than in the field.)

FIG. 4 also illustrates how further coils 22 and 23 can be used to detect destructive currents, in conjunction with coils 5 and 15.

Figure 7:
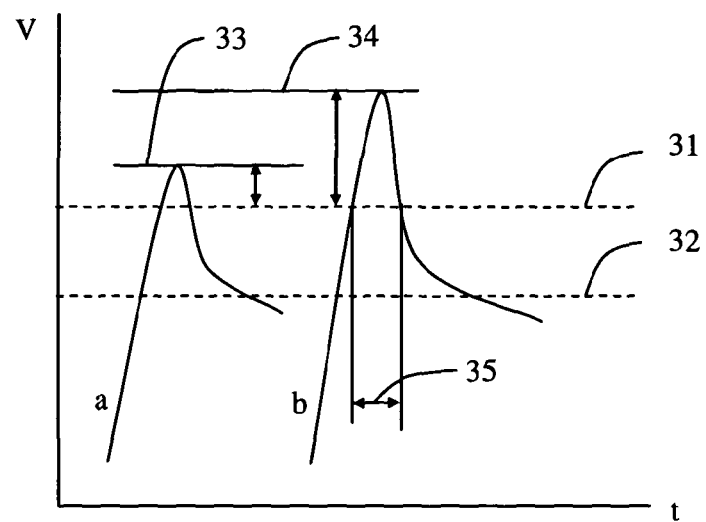

FIG. 7 illustrates how the electrical circuit 27 functions in use. The graph shows voltage on the Y axis and time on the X axis, and shows two voltage surges, a and b, which could be detected by either coil 5 or 15 in use. Line 32 indicates a normal working voltage of the electrical circuit 27, while line 31 indicates an avalanche point. In the case of voltage surge a, this exceeds the normal working voltage 32 and the avalanche point 31, and reaches level 33. However, level 33 does not exceed a stress threshold of the of the protection device 4 or 14, so no breach is registered or counted. However, voltage surge b exceeds the avalanche point 31 and reaches level 34, which does exceed the threshold of the protection device 4 or 14. Therefore, a breach is recorded, as well as its duration, indicated at 35. Therefore, the severity of the electrical fast transient event is assessed by the amount of overshoot voltage seen at the rails. Curve a is obviously less severe than curve b, and the user can utilise this information as desired.

Various other circuit configurations are possible within the scope of claim 1. For example, one other possible embodiment (not shown) involves the conditioning unit 17 communicating with the human machine interface 21 by means of modifications to the physical layer, performed by a physical layer modifier.

In other possible embodiments (not shown) the monitoring devices comprise devices which detect a change in a physical state of the associated protection device, including its magnetic state or an optically detectable physical state.

Figure 5:
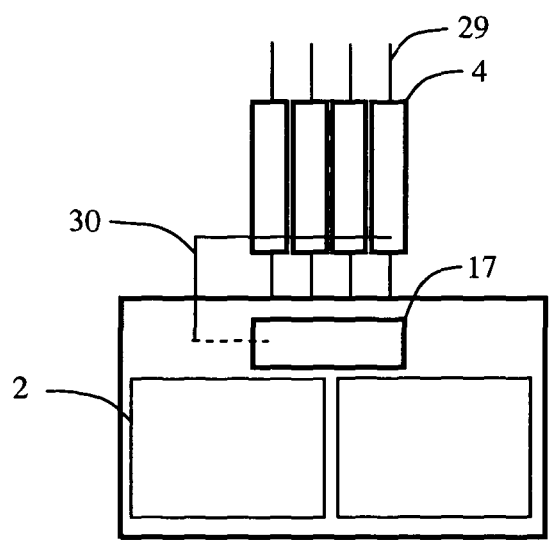
FIG. 5 is a diagrammatic view of part of a fifth electrical circuit according to the present invention.

FIG. 5 illustrates how the invention can be integrated into a standard Fieldbus system. In particular, a diagnostics module 17 (which performs the same function as the conditioning unit 17 described above) can be disposed on a mother board between the Fieldbus power supplies 2 and a number of Fieldbus segments 29. Surge protection devices 4 are provided for each segment 29. The connection 30 between the diagnostics module 17 and the Fieldbus segments 29 can be point to point, or a serial bus.

In an alternative arrangement (not shown) one surge protection device is positioned at the power supply, as above, but another positioned at the load, which in the case of a Fieldbus arrangement can be a plurality of loads comprising device couplers.

Figure 6:
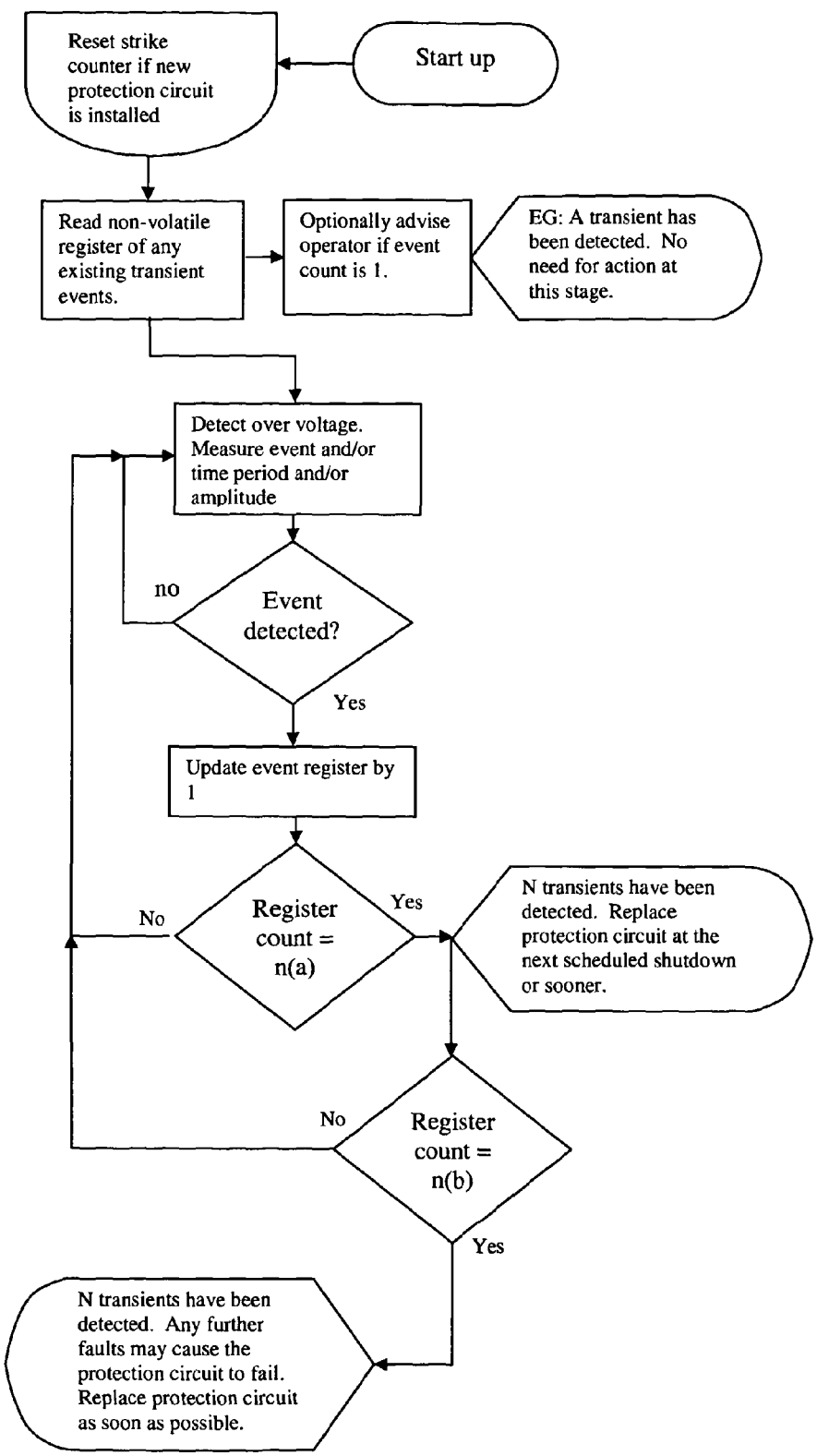
FIG. 6 is a flow chart illustrating a method of functioning of an electrical circuit according to the present invention; and, FIG. 7 is a graph illustrating a method of functioning of an electrical circuit according to the present invention.

FIG. 6 is a flow chart which illustrates how the software in the diagnostic means in any of the above described electrical circuits may be configured in practice to deal with electrical fast transient events using a counting method. The flow chart is self-explanatory.

Therefore, the present invention provides a monitoring device which specifically monitors the current incident in a surge protection device, such that it can be known if, or how many times, it has been subjected to an electrical fast transient event, and appropriate remedial action taken to prevent a fault occurring, for example a surge protection device failing to a low impedance and/or a short circuit and/or inflicting other disruptive affects on a IEC61158-2 Fieldbus signal or network.

The invention claimed is:

1. An electrical circuit comprising a power supply, a load and a surge protection device adapted to protect said load and/or power supply from voltage and/or current surges caused by electrical fast transient events according to the requirements of IEC 61000-4-2 or 4 by automatically creating a shunt in said electrical circuit, in which said surge protection device comprises a voltage and/or current stress threshold at which it automatically creates a shunt in said electrical circuit, in which the electrical circuit further comprises a monitoring device adapted to monitor the current in said surge protection device and detect the breaching of said stress threshold by electrical fast transient events, in which an output of said monitoring device is connected to a diagnostic means, in which said diagnostic means is adapted to discern from raw data received from said output if said stress threshold has been breached in use, in which said diagnostic means is adapted to present human discernable data to a user derived from said raw data, in which the human discernable data presented by the diagnostic means includes at least: the detection of a breach of said stress threshold by an electrical fast transient event; the number of times a breach of said stress threshold by an electrical fast transient event has been detected; and, the frequency of breaches of said stress threshold by an electrical fast transient event; in which if the detected frequency of breaches of said stress threshold is within a predetermined shorter frequency limit a particular warning is presented to said user indicating that there may be a frequent fault that could imminently cause said surge protection device to fail, and in which if the detected frequency of breaches of said stress threshold is beyond a predetermined infrequent frequency limit, then a particular status report is presented to said user indicating that maintenance or repair of said surge protection device can be postponed to a much later time, or after a higher number of breaches of said stress threshold.

2. An electrical circuit as claimed in claim 1 in which said surge protection device is differential mode.

3. An electrical circuit as claimed in claim 1 in which said surge protection device is common mode.

4. An electrical circuit as claimed in claim 2 or 3 in which said monitoring device is a coil of wire or PCB track axially wound around the protection device and/or a conductive lead or PCB track of the protection device.

5. An electrical circuit as claimed in claim 2 or 3 in which said monitoring device is a coil of wire, a coil of PCB track or a capacitive plate arranged in parallel with the protection device and/or a conductive lead or PCB track of the protection device.

6. An electrical circuit as claimed in claim 2 or 3 in which said monitoring device comprises a sensor adapted to detect a change in a physical state of the protection device, which physical state is one or more of the following: magnetic state; optically detectable physical state.

7. An electrical circuit as claimed in claim 2 or 3 in which said monitoring device comprises a sensor directly connected to the protection device and/or a conductive lead or PCB track of the protection device, in which said sensor comprises one or more of the following: a transformer; a capacitor; a resistor; a semiconductor.

8. An electrical circuit as claimed in claim 1 in which said diagnostic means comprises a field based communications device and a human machine interface at a separate location, and in which said communications device is adapted to send machine readable communications data to said human machine interface derived from said raw data, and in which said human machine interface is adapted to convert said machine readable communications data into human discernable data.

9. An electrical circuit as claimed in claim 8 in which the human discernable data presented by the diagnostic means also includes one or more of the following factors: the detection of a current surge between a trigger level and said stress threshold; the reaching of a pre-determined number of times a breach of said stress threshold by an electrical fast transient event have been detected; characteristics of a breach of said stress threshold by an electrical fast transient event, including one or more of its duration, magnitude, amplitude, integral or wave shape.

10. An electrical circuit as claimed in claim 9, in which said machine readable communications data is sent to said human machine interface via a communications means separate from said electrical circuit.

11. An electrical circuit as claimed in claim 9, in which said machine readable communications data is sent to said human machine interface over said electrical circuit.

12. An electrical circuit as claimed in claim 11 in which said machine readable communications data comprises physical layer modifications to said electrical circuit, which are discernable by said human machine interface.

13. An electrical circuit comprising a power supply, a load and a first surge protection device adapted to protect said load and/or said power supply from voltage and/or current surges caused by electrical fast transient events according to the requirements of IEC 6100-4-2 or 4 by automatically creating a shunt in said electrical circuit, in which said first surge protection device comprises a voltage and/or current stress threshold at which it automatically creates a shunt in said electrical circuit, in which the electrical circuit further comprises a first monitoring device adapted to monitor the current in said first surge protection device and detect the breaching of said stress threshold by electrical fast transient events, in which a first output of said first monitoring device is connected to a first diagnostic means, in which said first diagnostic means is adapted to discern from raw data received from said first output if said stress threshold has been breached in use, in which said first diagnostic means is adapted to present human discernable data to a user derived from said raw data, in which the human discernable data presented by the first diagnostic means includes at least: the detection of a breach of said stress threshold by an electrical fast transient event; the number of times a breach of said stress threshold by an electrical fast transient event has been detected; and, the frequency of breaches of said stress threshold by an electrical fast transient event; in which if the detected frequency of breaches of said stress threshold is within a predetermined shorter frequency limit a particular warning is presented to said user indicating that there may be a frequent fault that could imminently cause said surge protection device to fail, in which if the detected frequency of breaches of said stress threshold is beyond a predetermined infrequent frequency limit, then a particular status report is presented to said user indicating that maintenance or repair of said surge protection device can be postponed to a much later time, or after a higher number of breaches of said stress threshold, in which said electrical circuit further comprises a second surge protection device adapted to protect said load and/or power supply from voltage and/or current surges caused by electrical fast transient events according to the requirements of IEC 61000-4-2 or 4 by automatically creating a shunt in said electrical circuit, in which said second surge protection device comprises a voltage and/or current stress threshold at which it automatically creates a shunt in said electrical circuit, in which the electrical circuit further comprises a second monitoring device adapted to monitor the current in said second surge protection device and detect the breaching of said stress threshold by electrical fast transient events, in which a second output of said second monitoring device is connected to a second diagnostic means, in which said second diagnostic means is adapted to discern from raw data received from said second output if said stress threshold has been breached in use, in which said second diagnostic means is adapted to present human discernable data to a user derived from said raw data, in which the human discernable data presented by the second diagnostic means includes at least: the detection of a breach of said stress threshold by an electrical fast transient event; the number of times a breach of said stress threshold by an electrical fast transient event has been detected; and, the frequency of breaches of said stress threshold by an electrical fast transient event; in which if the detected frequency of breaches of said stress threshold is within a predetermined shorter frequency limit a particular warning is presented to said user indicating that there may be a frequent fault that could imminently cause said surge protection device to fail, in which if the detected frequency of breaches of said stress threshold is beyond a predetermined infrequent frequency limit, then a particular status report is presented to said user indicating that maintenance or repair of said surge protection device can be postponed to a much later time, or after a higher number of breaches of said stress threshold, and in which said second surge protection device is common mode.

14. An electrical circuit as claimed in claims 1 or 13 in which the electrical circuit is a Fieldbus circuit conforming to the IEC 61158-2 standard.

15. An electrical circuit as claimed in claim 13 in which the human discernable data presented by said first diagnostic means also includes one or more of the following factors the detection of a current surge between a trigger level and said stress threshold; the reaching of a pre-determined number of times a breach of said stress threshold by an electrical fast transient event have been detected; characteristics of a breach of said stress threshold by an electrical fast transient event, including one or more of its duration, magnitude, amplitude, integral or wave shape, and in which the human discernable data presented by said second diagnostic means also includes one or more of the following factors: the detection of a current surge between a trigger level and said stress threshold; the reaching of a pre-determined number of times a breach of said stress threshold by an electrical fast transient event have been detected; characteristics of a breach of said stress threshold by an electrical fast transient event, including one or more of its duration, magnitude, amplitude, integral or wave shape.

16. An electrical circuit as claimed in claim 13 in which said first surge protection device is differential mode.

17. An electrical circuit as claimed in claim 13 in which said first surge protection device is common mode.

18. An electrical circuit as claimed in claim 16 or 17 in which said first and second monitoring device is a coil of wire or PCB track axially wound around the protection device and/or a conductive lead or PCB track of the protection device.

19. An electrical circuit as claimed in claim 16 or 17 in which said first and second monitoring device is a coil of wire, a coil of PCB track or a capacitive plate arranged in parallel with the protection device and/or a conductive lead or PCB track of the protection device.

20. An electrical circuit as claimed in claim 16 or 17 in which said first and second monitoring device comprises a sensor adapted to detect a change in a physical state of the protection device, which physical state is one or more of the following: magnetic state; optically detectable physical state.

21. An electrical circuit as claimed in claim 16 or 17 in which said first and second monitoring device comprises a sensor directly connected to the protection device and/or a conductive lead or PCB track of the protection device, in which said sensor comprises one or more of the following: a transformer; a capacitor; a resistor; a semiconductor.

22. An electrical circuit comprising a power supply, a load and a surge protection device adapted to protect said load and/or power supply from voltage and/or current surges caused by electrical fast transient events according to the requirements of IEC 61000-4-2 or 4 by automatically creating a shunt in said electrical circuit, in which said surge protection device comprises a voltage and/or current stress threshold at which it automatically creates a shunt in said electrical circuit, in which the electrical circuit further comprises a monitoring device adapted to monitor the current in said surge protection device and detect the breaching of said stress threshold by electrical fast transient events, in which an output of said monitoring device is connected to a diagnostic means, in which said diagnostic means is adapted to discern from raw data received from said output if said stress threshold has been breached in use, in which said diagnostic means is adapted to present human discernable data to a user derived from said raw data, in which the human discernable data presented by the diagnostic means includes at least: the detection of a breach of said stress threshold by an electrical fast transient event; the number of times a breach of said stress threshold by an electrical fast transient event has been detected; and the detection of a current surge between a trigger level and said stress threshold; in which if a current surge exceeds said trigger level but does not exceed said stress threshold no breach of said stress threshold is counted towards the number of times a breach of said stress threshold by an electrical fast transient event has been detected, but the detection of a current surge between said trigger lever and said stress threshold is checkable by a user to determine if an electrical fast transient event did not result in a breach of said stress threshold.

23. An electrical circuit comprising a power supply, a load and a surge protection device adapted to protect said load and/or power supply from voltage and/or current surges caused by electrical fast transient events according to the requirements of IEC 61000-4-2 or 4 by automatically creating a shunt in said electrical circuit, in which said surge protection device comprises a voltage and/or current stress threshold at which it automatically creates a shunt in said electrical circuit, in which the electrical circuit further comprises a monitoring device adapted to monitor the current in said surge protection device and detect the breaching of said stress threshold by electrical fast transient events, in which an output of said monitoring device is connected to a diagnostic means, in which said diagnostic means is adapted to discern from raw data received from said output if said stress threshold has been breached in use, in which said diagnostic means is adapted to present human discernable data to a user derived from said raw data, in which the human discernable data presented by the diagnostic means includes at least: the detection of a breach of said stress threshold by an electrical fast transient event; the number of times a breach of said stress threshold by an electrical fast transient event has been detected; and, characteristics of a breach of said stress threshold by an electrical fast transient event including its duration and magnitude, and in which if a current surge exceeds said stress threshold its duration is recorded so the severity of the electrical fast transient event is assessed by the amount of overshoot voltage in said surge protection device.

* * * * *